United States Patent [19]

Lauf et al.

[11] Patent Number: 5,332,906

[45] Date of Patent: Jul. 26, 1994

[54] SCINTILLATOR ASSEMBLY FOR ALPHA RADIATION DETECTION AND AN ASSOCIATED METHOD OF MAKING

[75] Inventors: Robert J. Lauf; Stephanie A. McElhaney; John B. Bates, all of Oak Ridge, Tenn.

[73] Assignee: Martin Marietta Energy Systems, Inc., Oak Ridge, Tenn.

[21] Appl. No.: 928,999

[22] Filed: Aug. 12, 1992

[51] Int. Cl.$^5$ .............................................. G01T 1/202
[52] U.S. Cl. ............................... 250/483.1; 250/361 R; 252/301.4 R
[58] Field of Search .................. 250/361 R, 483.1; 252/301.4 R

[56] References Cited

U.S. PATENT DOCUMENTS

| 3,887,451 | 6/1975 | Cuomo et al. | 204/192.13 |
| 4,550,256 | 10/1985 | Berkstresser et al. | 250/483.1 |
| 5,057,692 | 10/1991 | Greskovich et al. | 250/361 R |

FOREIGN PATENT DOCUMENTS

| 4347 | 7/1986 | PCT Int'l Appl. | 252/301.4 R |
| 2000173 | 1/1979 | United Kingdom | 250/483.1 |

OTHER PUBLICATIONS

Keda et al, "Dosimetric and Scintillation Properties of Crystals with Garnet Structure", Z. Prikl. Spektrosk, 1984, 41 (5), pp. 867–869, Chem. Ab., vol. 102, abstract No. 34824m, 1985.

Primary Examiner—Carolyn E. Fields
Attorney, Agent, or Firm—Tracy G. Edmundson; Michael E. McKee; J. Donald Griffin

[57] ABSTRACT

A scintillator assembly for use in conjunction with a photomultiplier or the like in the detection of alpha radiation utilizes a substrate or transparent yttrium aluminum garnet and a relatively thin film of cerium-doped yttrium aluminum garnet coated upon the substrate. The film material is applied to the substrate in a sputtering process, and the applied film and substrate are annealed to effect crystallization of the film upon the substrate. The resultant assembly provides relatively high energy resolution during use in a detection instrument and is sufficiently rugged for use in field environments.

21 Claims, 2 Drawing Sheets

SCINTILLATOR ASSEMBLY FOR ALPHA RADIATION DETECTION AND AN ASSOCIATED METHOD OF MAKING

This invention was made with Government support under Contract No. DE-AC05-84OR21400 awarded by the U.S. Department of Energy to Martin Marietta Energy Systems, Inc. and the Government has certain rights to this invention.

BACKGROUND OF THE INVENTION

This invention relates generally to the detection of alpha radiation and relates, more particularly, to instruments used in the detection of alpha radiation.

Alpha scintillation survey instruments are known which utilize scintillation assemblies which interact with alpha particles to create light photons. However, conventional scintillation assemblies either do not provide the high energy resolution normally required to determine the energy of the alpha particles and the associated alpha-emitting isotope or possess sufficient ruggedness to accommodate use in field environments.

It is therefore an object of the present invention to provide a new and improved scintillator assembly for use in an alpha radiation instrument which provides high energy resolution during instrument operation and is sufficiently rugged for use in field environments and a method of making the assembly.

SUMMARY OF THE INVENTION

This invention resides in a scintillator assembly for use in the detection of alpha radiation and a method of making the assembly. The scintillator assembly of the invention includes a coating of cerium-doped yttrium aluminum garnet and an inert substrate upon which the coating is positioned.

The method of the invention includes the steps involved in making the assembly of the invention. Such steps include providing the substrate and applying the coating of cerium-doped yttrium aluminum garnet to the substrate. The substrate and coating are then annealed to achieve the desired crystallinity of the coating upon the substrate. In one embodiment of the method, the step of applying is effected by a sputtering process.

DETAILED DESCRIPTION OF THE ILLUSTRATED EMBODIMENTS

Figure 1:
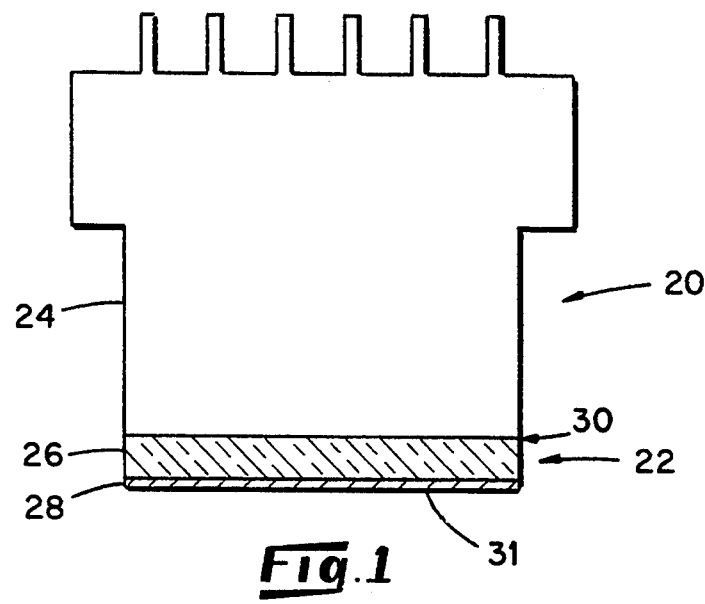
FIG. 1 is a transverse cross-sectional view of an instrument including an embodiment of a scintillator assembly.
Figure 2:
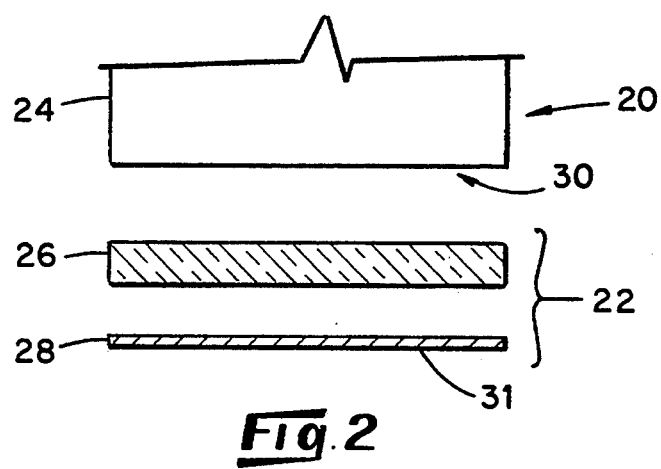
FIG. 2 is a fragmentary perspective view of the FIG. 1 instrument, shown exploded.

With reference to FIGS. 1 and 2, there is shown part of an instrument 20 for use in the detection of alpha radiation and within which an embodiment of a scintillator assembly, generally indicated 22, is incorporated. The instrument 20 includes a photomultiplier tube 24, and the assembly 22 is positioned adjacent the front of the tube 24. During operation of the instrument 20, particles of alpha radiation interact with the scintillator assembly 22 or, more specifically, the scintillation film 28 thereof, to create photons, and the created photons are guided, or focused, onto the front, indicated 30 in FIGS. 1 and 2, of the photomultiplier tube 24. The means and methods by which the created photons are sensed with the photomultiplier tube 24 are well known in the art so that a more detailed description of the detection componentry of the instrument 20 is not believed to be necessary.

The scintillator assembly 22 includes a thin multicrystalline film 28, introduced above, of cerium-doped yttrium aluminum garnet (YAG:Ce) coated upon a substrate 26 of optically-transparent, inert material, i.e., a substrate which is inert in the presence of YAG:Ce. In the depicted assembly 22, the film 28 is less than about ten micrometers thick and, more specifically, about four micrometers thick, and the substrate 26 is comprised of undoped yttrium aluminum garnet (YAG). If desired, the front, indicated 31 in FIGS. 1 and 2, of the film 28 may be covered with a thin layer of aluminum or another suitable material to provide the film surface 31 with satisfactory light-tight characteristics.

The material of the film 28 provides a relatively efficient scintillator when exposed to alpha sources but has been found to be also sensitive to beta and gamma interactions. Consequently, the film 28 is relatively thin in order to selectively detect alpha energy. However, because a single crystal of YAG is brittle, it is very difficult to thin a wafer of the crystal mechanically by grinding and polishing. Moreover, a film coating comprised of powdered scintillators have been found not to provide a high degree of alpha energy resolution, and spun-on coatings of the film material applied to the substrate 26 have been found to have limited adhesion so that the ruggedness of the resulting assembly is also limited.

Figure 3:
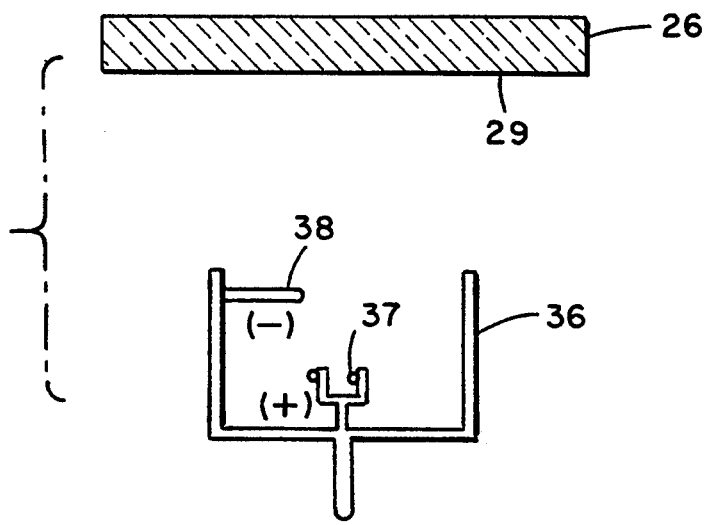
FIG. 3 is a schematic illustration of a step involved in the application of scintillator material atoms onto a substrate surface.

To form the depicted assembly 22 so as to provide the assembly 22 with desirable scintillation characteristics, the material of the film 28 is applied to the substrate 26 in a sputtering process. To this end and with reference to FIG. 3, there is schematically shown a radio frequency magnetron sputtering device 36 used to deposit atoms or groups of atoms of the scintillator material from a source or target 37 onto a surface, indicated 29, of the substrate 26. During a sputtering process to form the film 28 and by way of example, films are sputtered at 13.56 MHz, and sputtering gas is provided as a 3:2 mixture of argon to oxygen at a total pressure of 20 mTorr. Oxygen is added to the gas in an attempt to maintain oxygen stoichiometry in the film during sputtering. Using a source or target 37 of scintillator film material, the device 36 is operated with a forward power of 30 W and a direct current bias of about 115 V so that the scintillator material atoms move from the source 37 and are deposited upon the substrate surface 29 at a rate of about 0.7 nm/min, as measured at the substrate surface 29 located 5 cm from the sputtering target 37. This sputtering process is continued until the film 28 attains the desired thickness upon the substrate surface 29.

Figure 4:
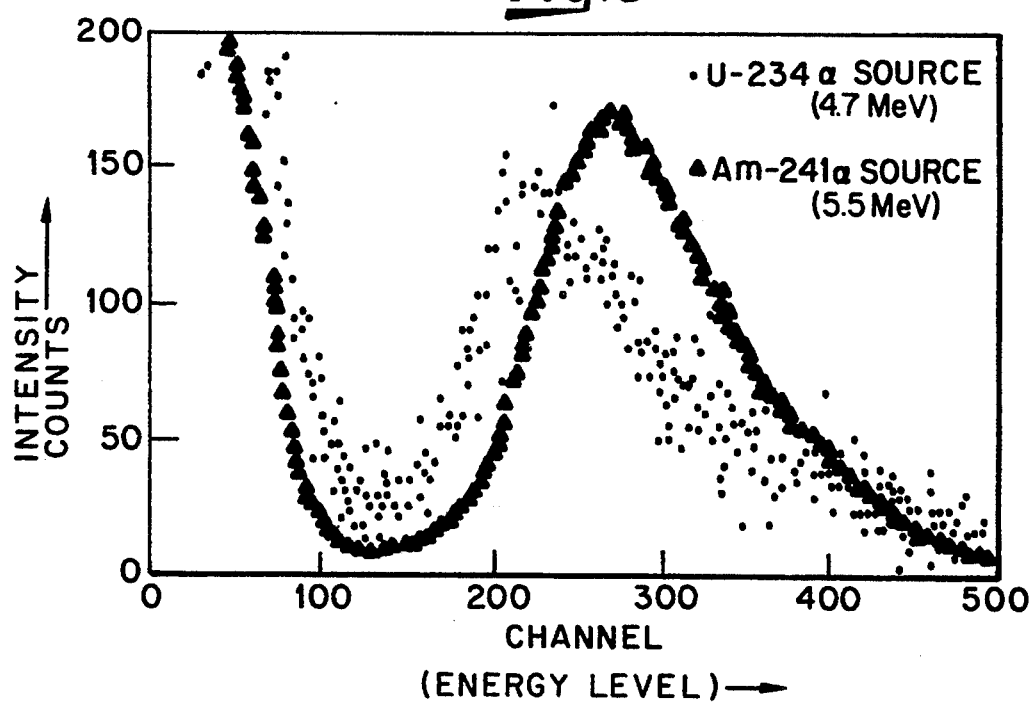
FIG. 4 is a plot of energy versus intensity for the assembly of the FIG. 1 instrument.

After the sputtering process is completed, the substrate 26 and film 28 are annealed in air. Without this annealing step, the as-deposited film 28 does not scintillate effectively. Such ineffectiveness is believed to be due to either an amorphous condition of the as-deposited film 28 or because the oxygen stoichiometry in the film 28 is incorrect. In any event, the substrate 26 and film 28 are repeatedly annealed in air at about 500° C.

for periods of about 15 minutes, 20 minutes, 1.0 hour, 2.0 hours, and 6.0 hours. These annealing steps effect crystallization and grain growth of the scintillator film material upon the substrate 26. After annealing, the film 28 not only scintillates effectively but provides for resolution of peaks in a plot of energy versus intensity when detecting energy from various alpha sources, as shown in FIG. 4. The separation of such peaks can be increased by increasing the thickness of the scintillator film 28 and by heating the substrate 26 during film deposition to further encourage epitaxial growth and improve adhesion.

If the film 28 is desired to be rendered light-tight, a thin layer of aluminum may be applied to the exposed (i.e. front) surface of the film 28 in, for example, an evaporation process (i.e., e-beam evaporation). Such a light-tight coating may possess a thickness, for example, of about 8000 angstroms.

An advantage provided by the assembly 22 relates to both its improved ruggedness and improved energy resolution. The assembly 22 is particularly well-suited for use in field situations where alpha energy resolution is desirable, such as radon monitoring where alpha energies of Rn daughter products (about 6 MeV) can be windowed from background or contamination from U or Pu (4-5.5 MeV), or for use in conjunction with air stack monitors to indicate a release or radioisotopes and also to provide information as to which radioisotopes were released. The technology involved here can also extend to the sputtering of scintillation coatings inside tubes, for example, for use in the monitoring of contamination in a flow of air or water.

It will be understood that numerous modification and substitutions can be had to the aforementioned embodiments without departing from the spirit of the invention. For example, the thickness of the film 28 of the aforedescribed assembly 22 may be varied to control the amount of alpha, beta and gamma radiation absorbed thereby. Furthermore, although the aforedescribed substrate 26 has been described as being comprised of undoped yttrium aluminum garnet (YAG), the substrate may be comprised of glass, although the resulting scintillator assembly may not scintillate as effectively as with YAG. Accordingly, the aforementioned embodiments are intended for the purpose of illustration and not as limitation.

We claim:

1. A scintillator assembly for the detection of alpha radiation comprising:
   a multicrystalline scintillating film of cerium doped yttrium aluminum garnet; and
   a chemically inert, to cerium doped yttrium aluminum garnet, optically transparent substrate upon which the multicrystalline scintillating film is deposited.

2. The assembly as defined in claim 1 wherein the multicrystalline scintillating film is relatively thin in comparison to the thickness of the substrate.

3. The assembly as defined in claim 1 wherein the multicrystalline scintillating film is less than about ten micrometers thick.

4. The assembly as defined in claim 1 wherein the multicrystalline scintillating film is about four micrometers thick.

5. The assembly as defined in claim 1 wherein the substrate is yttrium aluminum garnet.

6. The assembly as defined in claim 1 wherein at least some of the multicrystalline scintillating film is epitaxially aligned with the substrate.

7. A scintillator assembly for the detection of alpha radiation comprising:
   a substrate of a chemically inert, to cerium doped yttrium aluminum garnet, optically transparent material having a surface; and
   a multicrystalline scintillating film which is relatively thin in comparison to the thickness of the substrate, said film being deposited on the surface of the substrate so as to provide a front surface for said assembly against which particles desired to be detected impinge, and at least some of the multicrystalline scintillating film is epitaxially aligned with the substrate.

8. The assembly of claim 7 wherein the multicrystalline scintillating film is cerium doped yttrium aluminum garnet and the substrate is a crystalline material.

9. The assembly of claim 7 wherein the substrate is yttrium aluminum garnet.

10. The assembly of claim 7 wherein the thickness of the multicrystalline scintillating film is less than about ten micrometers.

11. The assembly of claim 8 wherein the cerium comprises less than about 5 atomic percent of the multicrystalline scintillating film.

12. A method of constructing a scintillator assembly for the detection of alpha radiation comprising the steps of:
    providing an optically transparent substrate which is chemically inert to cerium doped yttrium aluminum garnet, and
    depositing a multicrystalline scintillating film of cerium doped yttrium aluminum garnet onto the substrate so that at least some of the multicrystalline scintillating film is epitaxially aligned with the substrate.

13. The method as defined in claim 12 wherein the depositing method is sputtering.

14. The method as defined in claim 12 wherein the depositing method is sputtering followed by annealing to encourage grain growth of the multicrystalline scintillating film.

15. The method as defined in claim 12 wherein the depositing provides a multicrystalline scintillating film thickness of less than about ten micrometers.

16. The method as defined in claim 12 wherein the depositing method is sputtering followed by a first annealing followed by a second annealing to further encourage grain growth of the multicrystalline scintillating film.

17. The method as defined in claim 12 wherein the depositing is performed at an elevated temperature to encourage epitaxial alignment of the multicrystalline scintillating film with the substrate.

18. A method of constructing a scintillator assembly for the detection of alpha radiation comprising the steps of:
    providing a substrate of optically transparent yttrium aluminum garnet;
    sputtering a multicrystalline scintillating film of cerium-doped yttrium aluminum garnet onto the substrate; and
    annealing the scintillator assembly to encourage grain growth of the multicrystalline scintillating film.

19. The method as defined in claim 18 wherein the annealing is a first annealing and the first annealing is followed by a second annealing to further encourage grain growth of the multicrystalline scintillating film.

20. A method of constructing a scintillator assembly for the detection of alpha radiation comprising the steps of:

providing a substrate of a chemically inert optically transparent material having a surface;

depositing a multicrystalline scintillating film onto the substrate surface; and annealing the scintillator assembly to encourage grain growth and correct discrepancies in the oxygen stoichiometry of the multicrystalline scintillating film.

21. The method of claim 20 wherein the depositing method is sputtering.

* * * * *